Feb. 7, 1933.  J. R. PEIRCE  1,896,554
ACCOUNTING MACHINE
Original Filed Oct. 18, 1927  13 Sheets-Sheet 1

Feb. 7, 1933.   J. R. PEIRCE   1,896,554
ACCOUNTING MACHINE
Original Filed Oct. 18, 1927   13 Sheets-Sheet 2
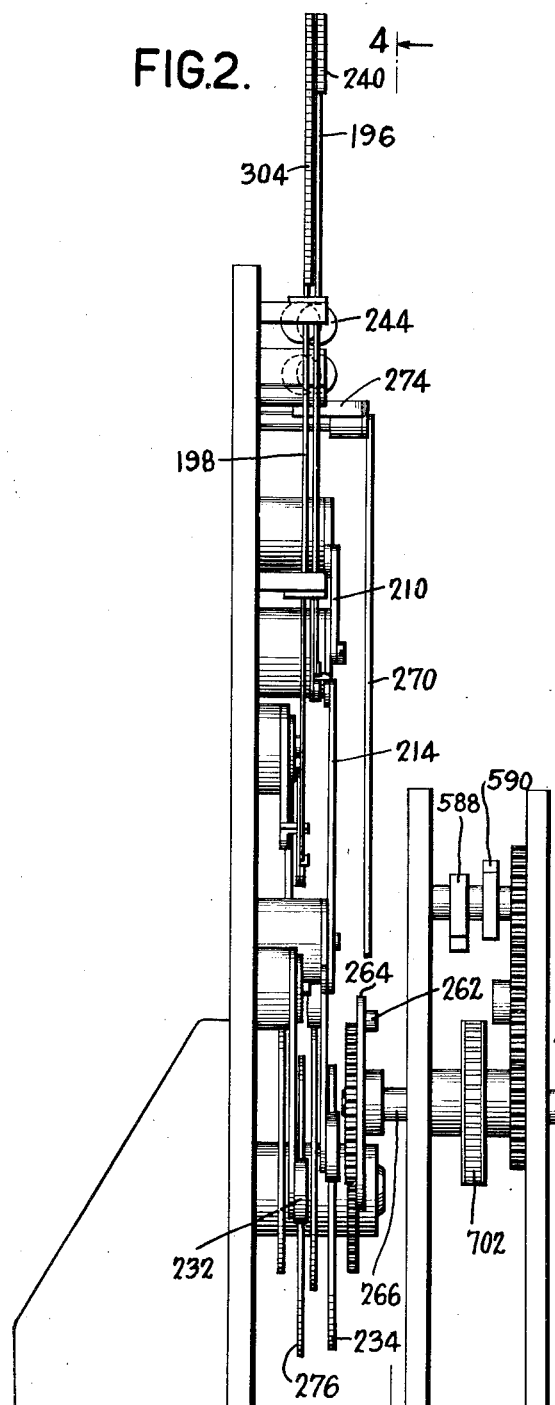
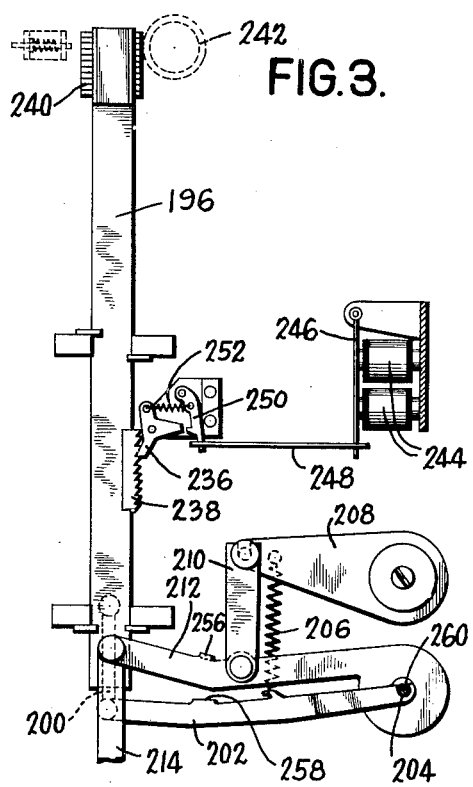
Inventor
J. R. Peirce
By his Attorney
W. M. Wilson

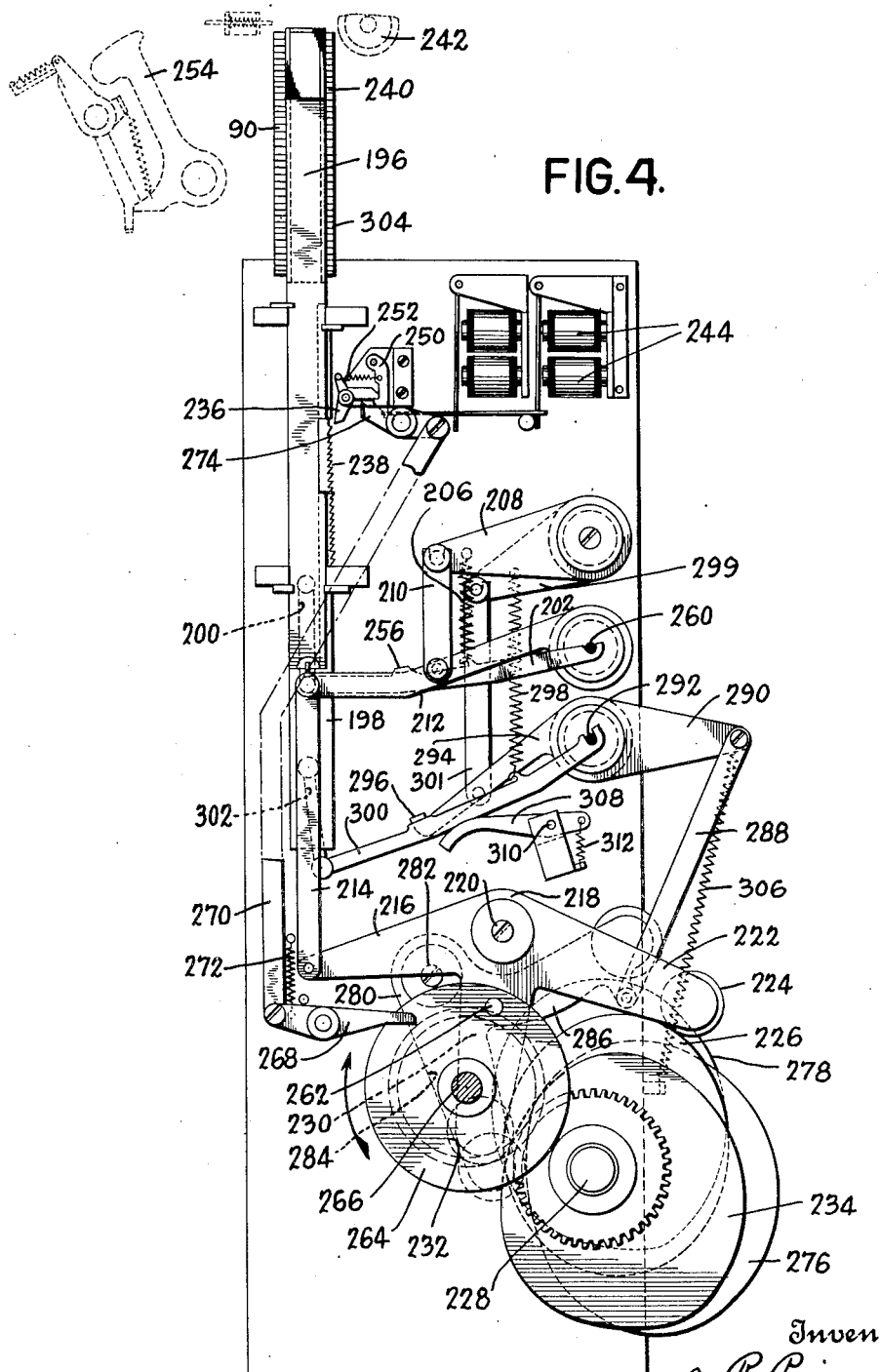

Feb. 7, 1933.  J. R. PEIRCE  1,896,554
ACCOUNTING MACHINE
Original Filed Oct. 18, 1927   13 Sheets-Sheet 4

Inventor
J. R. Peirce
By his Attorney

Feb. 7, 1933. J. R. PEIRCE 1,896,554
ACCOUNTING MACHINE
Original Filed Oct. 18, 1927 13 Sheets-Sheet 5

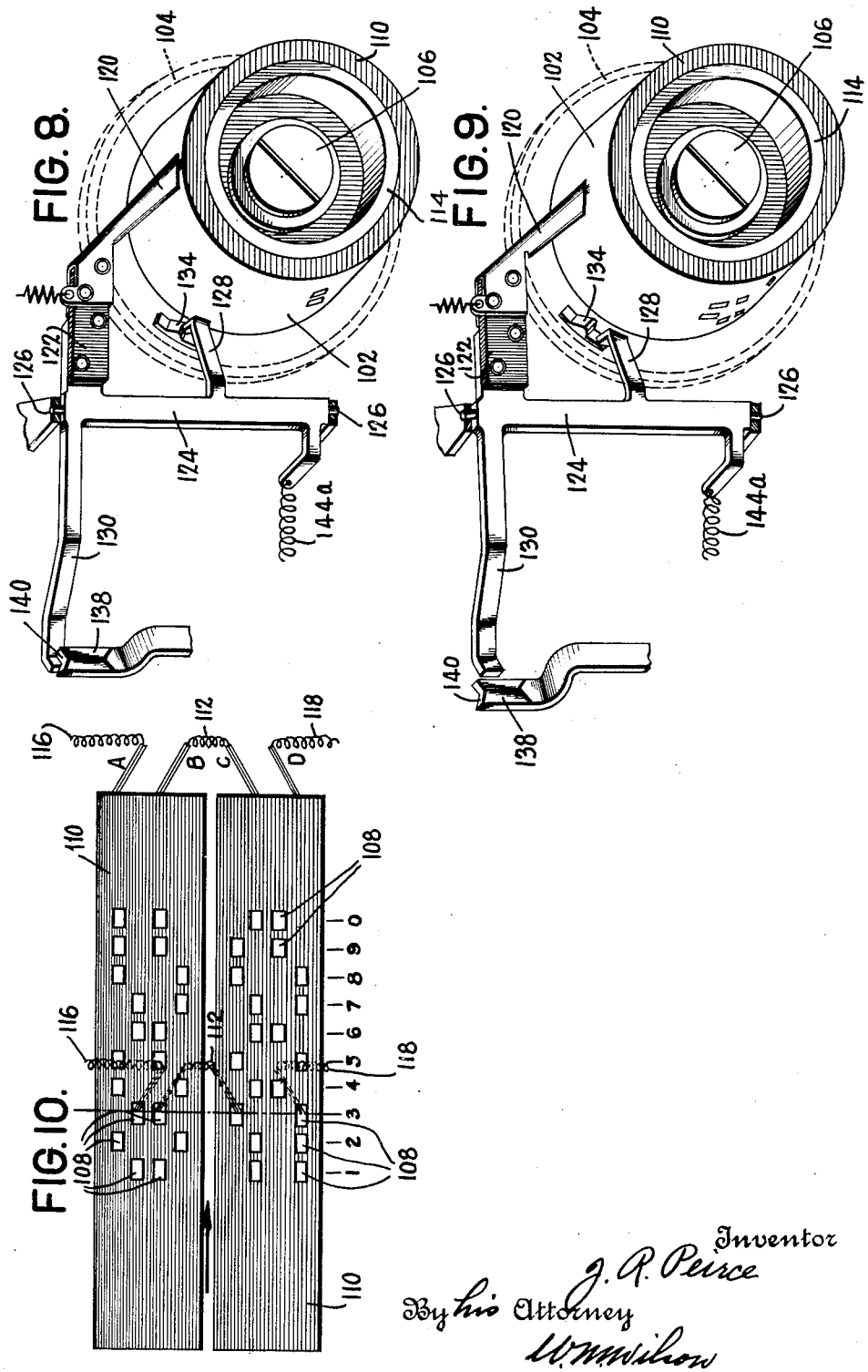

Feb. 7, 1933.    J. R. PEIRCE    1,896,554
ACCOUNTING MACHINE
Original Filed Oct. 18, 1927    13 Sheets-Sheet 7

Inventor
J. R. Peirce
By his Attorney
W M Wilson

Feb. 7, 1933.　　　　　　J. R. PEIRCE　　　　　　1,896,554
ACCOUNTING MACHINE
Original Filed Oct. 18, 1927　　13 Sheets-Sheet 8
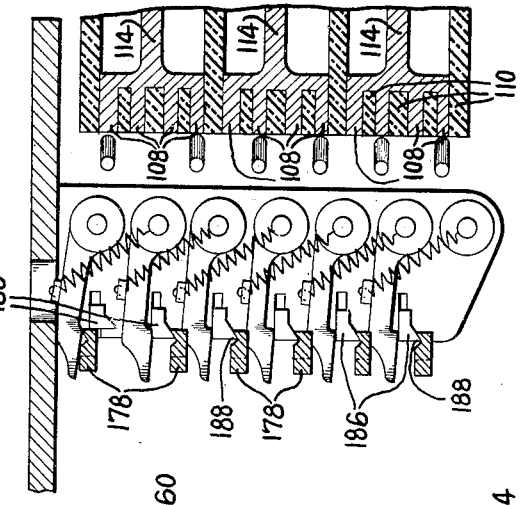
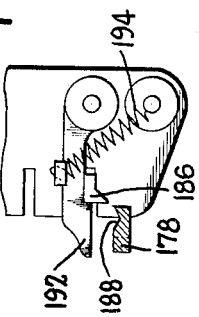
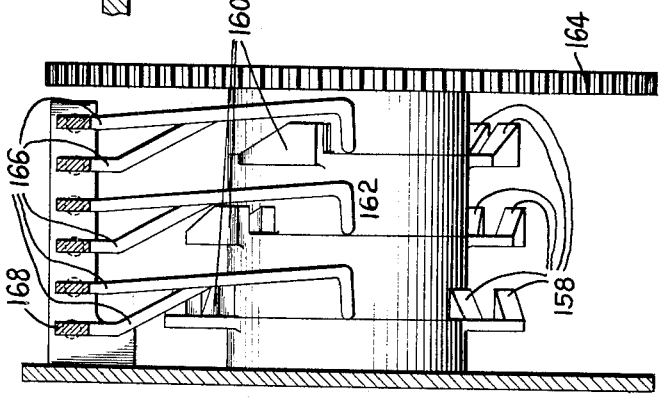
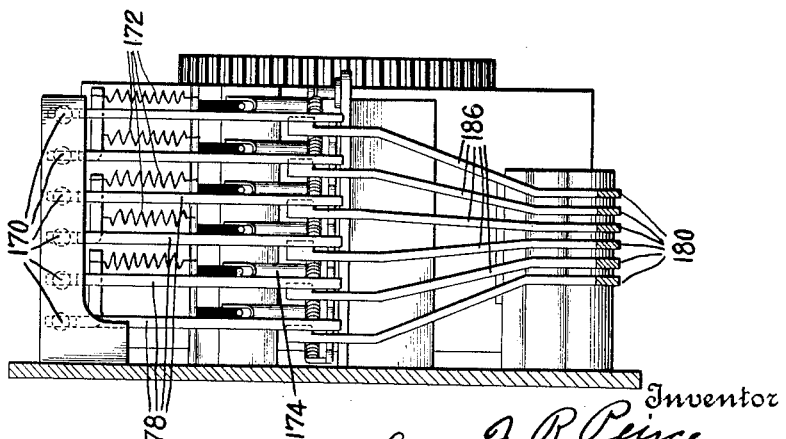
Inventor
J. R. Peirce
By his Attorney
W. M. Wilson

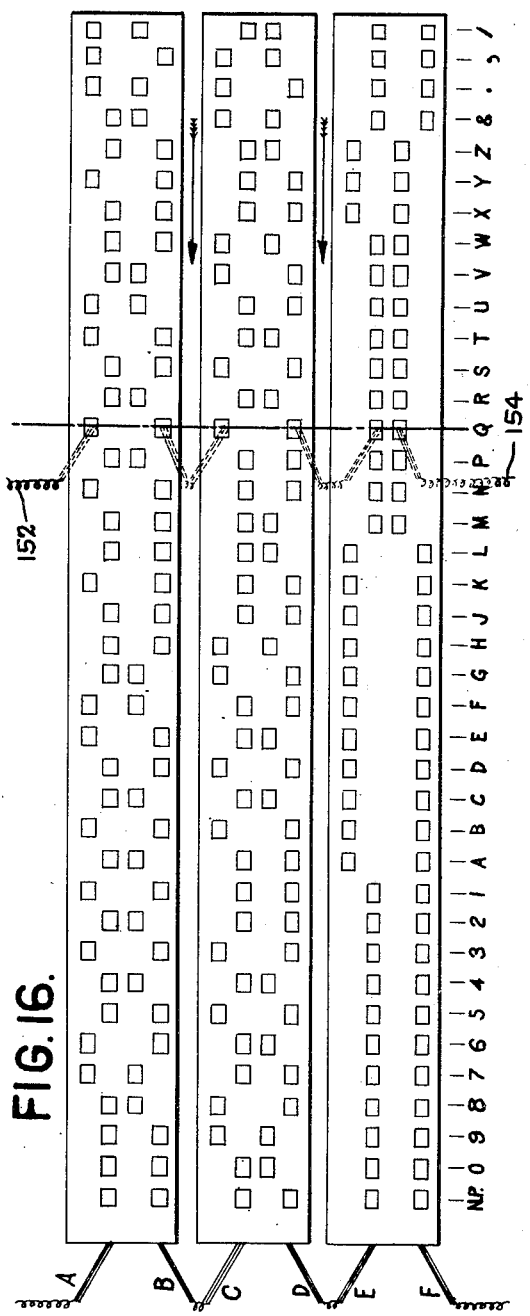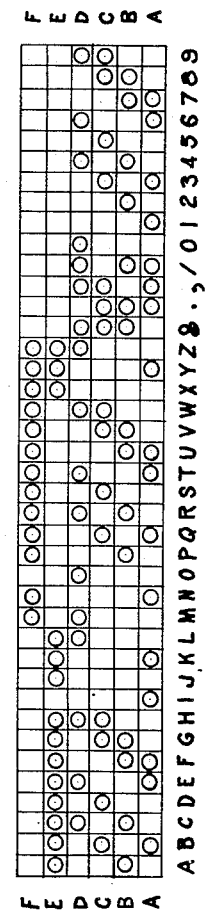

Feb. 7, 1933.　　　J. R. PEIRCE　　　1,896,554
ACCOUNTING MACHINE
Original Filed Oct. 18, 1927　　13 Sheets-Sheet 10

Inventor
J. R. Peirce
By his Attorney
W. M. Wilson

Feb. 7, 1933.　　　　J. R. PEIRCE　　　　1,896,554
ACCOUNTING MACHINE
Original Filed Oct. 18, 1927　　13 Sheets-Sheet 11
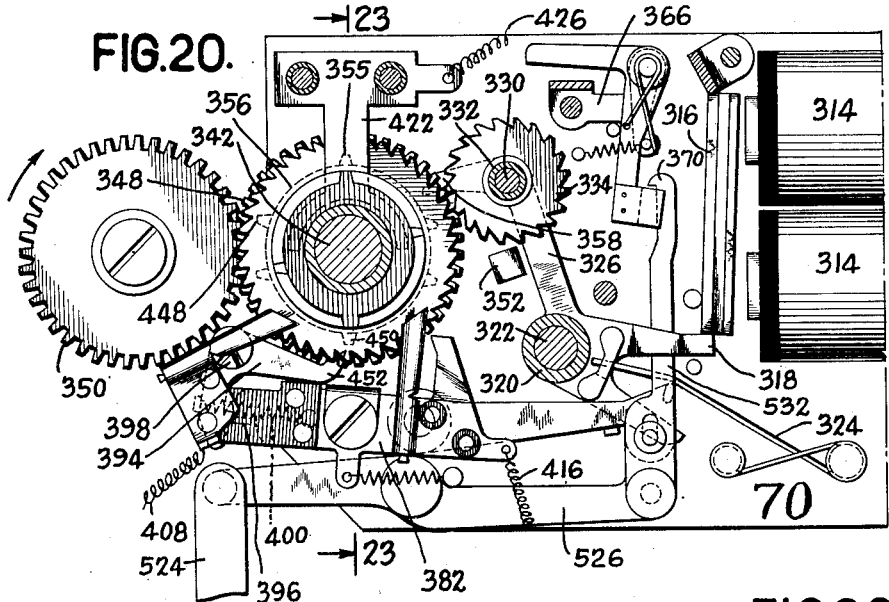
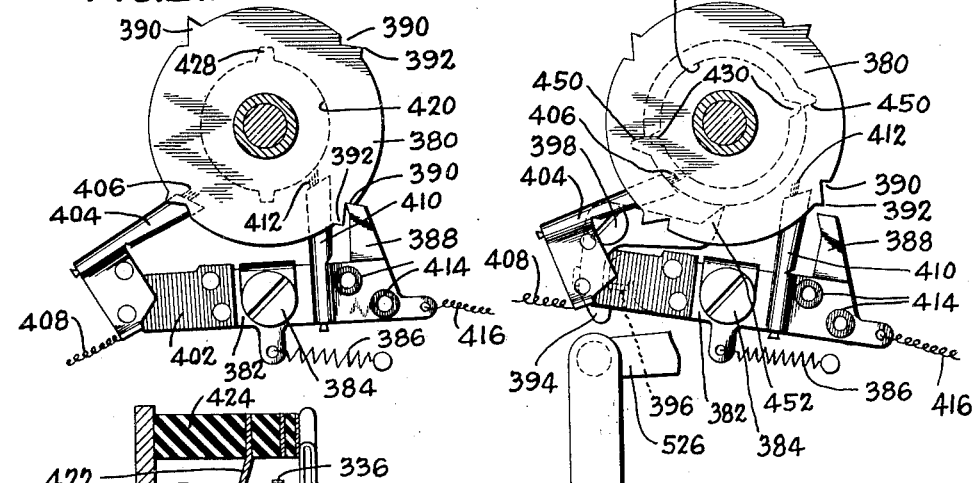
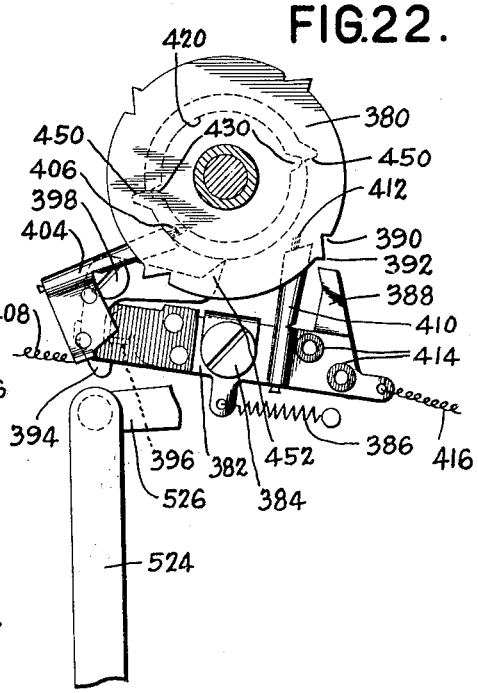
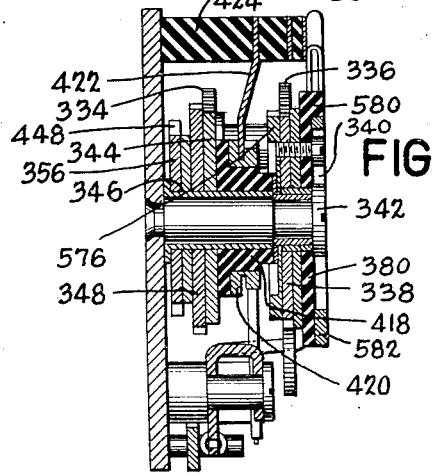

Feb. 7, 1933.   J. R. PEIRCE   1,896,554
ACCOUNTING MACHINE
Original Filed Oct. 18, 1927   13 Sheets-Sheet 12
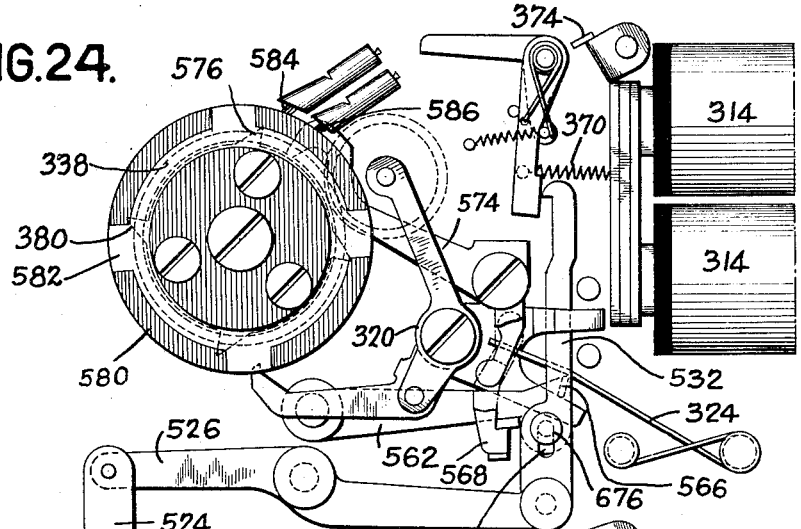
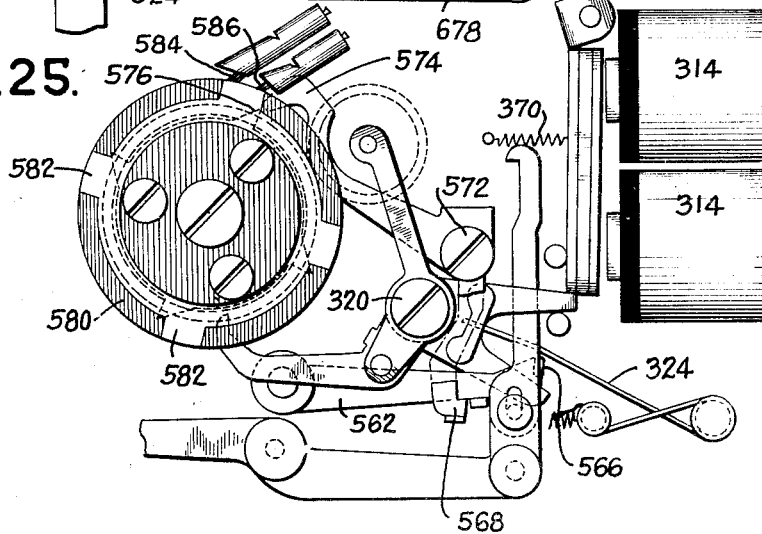
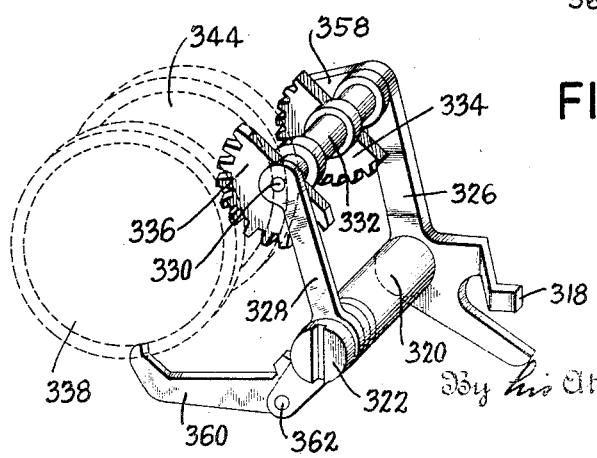
Inventor
J. R. Peirce
By his Attorney
W. M. Wilson

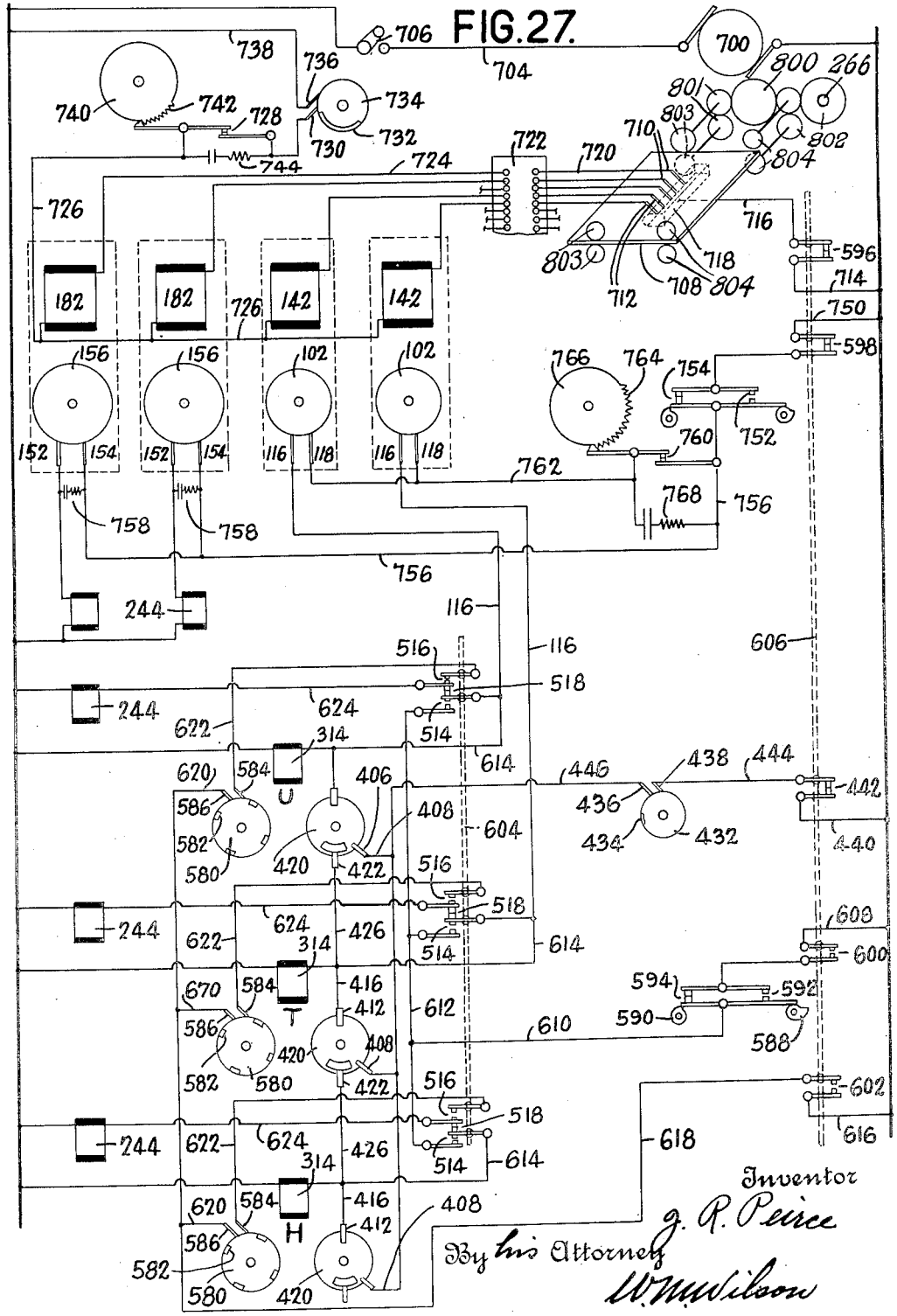

Patented Feb. 7, 1933

1,896,554

UNITED STATES PATENT OFFICE

JOHN ROYDEN PEIRCE, OF NEW YORK, N. Y., ASSIGNOR, BY MESNE ASSIGNMENTS, TO THE TABULATING MACHINE COMPANY, OF NEW YORK, N. Y., A CORPORATION OF NEW JERSEY

ACCOUNTING MACHINE

Original application filed October 18, 1927, Serial No. 226,845, and in Canada June 21, 1928. Divided and this application filed August 8, 1929. Serial No. 384,297.

This invention is directed to improvements in record controlled accounting machines.

One of the objects of the invention is to provide a construction permitting the use of record cards which contain not only the usual numerical statistics, but also alphabetical representations as well. The cards are perforated according to a combinational hole system, and the machine is adapted to sense the cards electrically and print upon a record sheet the numerical and alphabetical interpretation of these perforations.

The records are sensed while they are in motion, and the combinational hole reading is translated into a single hole reading by an electrical translator of rotary type which employs laterally shiftable brushes. Each translator, in turn, controls the position of a type carrier to bring the proper character or numeral to the printing line. One of the objects of the invention, therefore, is to provide means for sensing a combinational hole record while the record is in motion, for translating the reading thus obtained and for then printing an alphabetical or numerical representation of the original combinational hole reading.

A further object is the provision of a novel translator which employs a small number of parts and uses laterally shiftable brushes adapted to register with different paths on the rotary commutator for effecting the translation. Preferably each translator is controlled by a single magnet in place of a plurality of magnets as heretofore.

A further object resides in the provision of electrical sensing devices for reading records of the type known as Peirce combinational hole records, and for electrically controlling an alphabet printing mechanism. Heretofore it has been necessary to use mechanical or pin sensing devices in connection with mechanical translating apparatus for accomplishing that result. In the present invention the reading of the perforated record, the translation of the reading, and the control of the printing mechanism are all controlled electrically.

Another object is to provide novel means for controlling the sensing brush circuits. A master breaker is employed which makes up or establishes the brush circuits after the brushes encounter the holes in the record, and then breaks the circuit before the brushes leave the perforation. In this manner arcing is prevented and the maximum of available time is used for working circuits. Arcing at the card is wholly prevented, and may be effectively suppressed at the breaker, by suitable condenser and resistance.

Another object is to provide a novel positioning device for type bars, whereby the restoring shocks of the relatively heavy type bars may be minimized.

Another object is to provide simplified means for deriving totals from the accumulator. A simple brush and commutator device is provided for taking a total, and the total is taken upon the arrival of the accumulator elements at zero position after being forwardly reset by the differential actuator. Broadly, the taking of a total electrically in this general manner has been done before, but only by means of complicated contact mechanism which is here replaced by a simple brush and commutator.

Further and other objects and advantages will be hereinafter set forth in the accompanying specification and claims and shown in the drawings, which by way of illustration show what is now considered to be the preferred embodiment of the invention.

Fig. 2 is a side view showing the gearing, cams, and other mechanism in the rear of the front plate of Fig. 1.

Fig. 3 is a detail view of the printing type bars and devices for controlling them.

Fig. 4 shows the apparatus of Fig. 3 but in a different part of the operating cycle, together with actuating mechanism, on line 4—4 of Fig. 2.

Figs. 8 and 9 are perspective views of commutator and brush mechanism of the numerical translator, in different operative positions.

Fig. 10 is a developed view of the commutator contact arrangement of the numerical translator, together with a diagrammatic representation of the shiftable brushes.

Fig. 12 is a cross section of the alphabetical translator, on line 12—12 of Fig. 11.

Fig. 13 is a cross section of the alphabetical translator, on line 13—13 of Fig. 11.

Fig. 14 is a cross section of the alphabetical translator, on line 14—14 of Fig. 11.

Fig. 15 is a fragmentary detail showing an armature and its latch in a different portion of its operating cycle from that in Fig. 14.

Fig. 16 is a developed view of the commutator contact arrangement of the alphabetical translator together with a diagrammatic representation of the shiftable brushes.

Fig. 17 shows the alphabetical and numerical code used in describing the invention.

Fig. 20 is a view on line 20—20 of Fig. 19 to show the transfer mechanism of the accumulator.

Fig. 21 is a detail of the transfer mechanism at "9" position.

Fig. 22 is a detail of the transfer mechanism at "0" position.

Fig. 23 is a view on line 23—23 of Fig. 20.

Figs. 24 and 25 are detail views of the total taking devices of the accumulator showing total taking parts in different positions.

Fig. 26 is a perspective diagrammatic view of the radially enmeshing gear mechanism of the accumulator.

Fig. 27 is a wiring diagram of the electric circuit of the machine.

Figure 1:
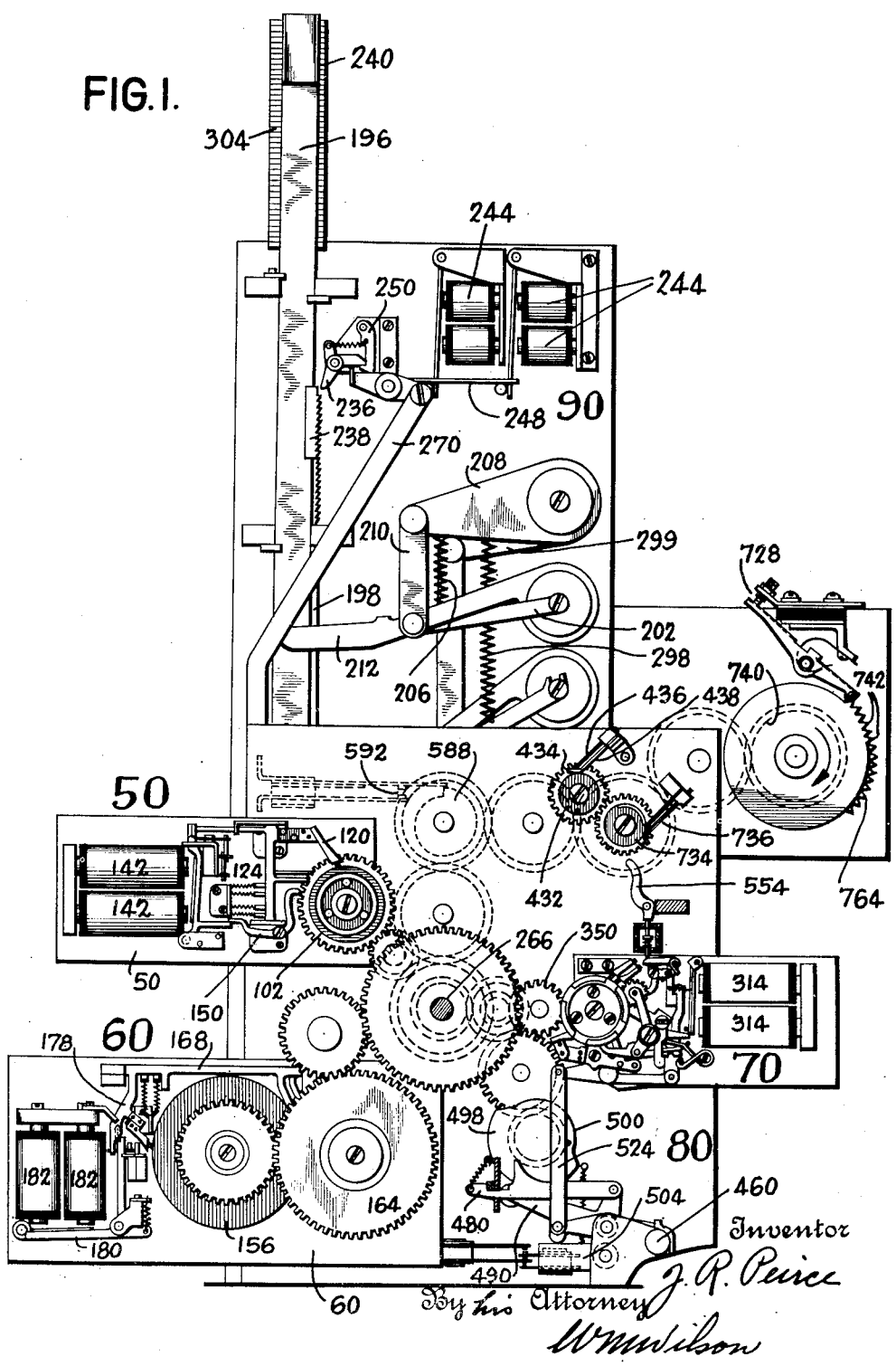
Fig. 1 is a front view of the machine showing printing mechanism, numerical and alphabetical translators, an accumulator, and total taking devices.
Figure 5:
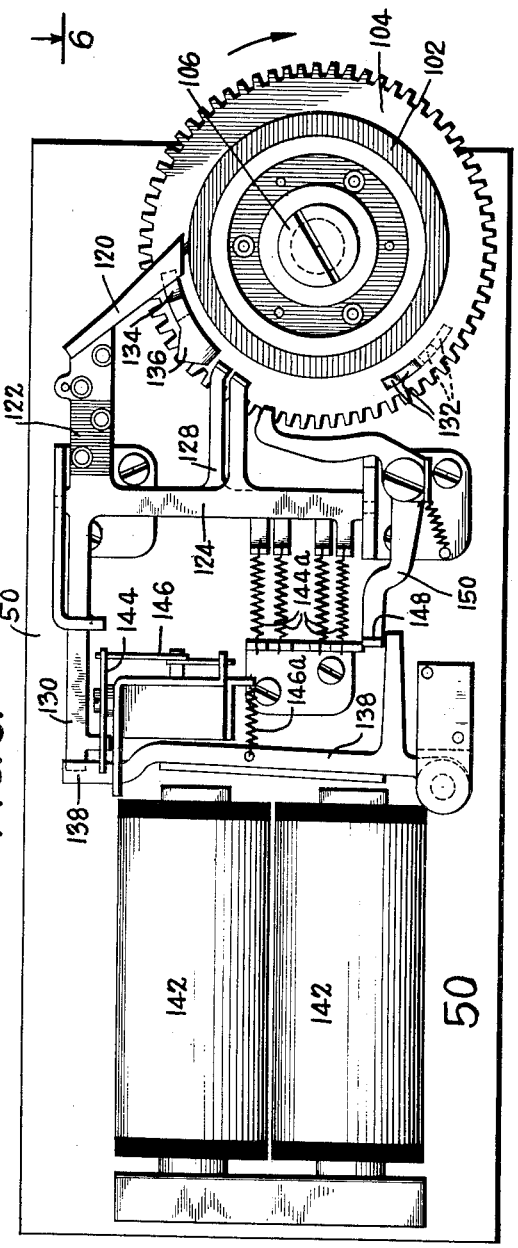
Fig. 5 is a front view of a numerical translator.

The present invention may be used with all known combinational hole card systems, but inasmuch as it finds its most comprehensive use in connection with "true" combinational hole systems, the apparatus is illustrated and described in connection with cards punched according to the well known Peirce system, which is the most widely known true combinational system.

By a "true" combinational system is meant a system of index points in which the character designating properties of each point of the combination are determined to some extent by all the other points with which it is associated. This distinguishes from other systems in which one point of each combination selects a group and its character designating properties are in no way affected by the other points of the combination.

For clarity and brevity of description the machine comprising the present invention is herein illustrated in its elemental form with only one each alphabetical and numerical translators, one accumulator with its total taking and transferring devices, one alphabetical and one numerical type bar. The card sensing devices and some other well known and unimportant features are shown conventionally. The circuit diagram shows two each of the translators, and three accumulator units, the better to illustrate the electric circuits, transfer devices, etc.

The machine comprises principally a card reading device 40 (Fig. 2), a numerical translator 50, an alphabetical translator 60, an accumulator 70, total control devices 80. and printing type mechanism 90 (Fig. 1), together with suitable actuating and control devices for the above.

The cards are divided into fields, with alphabetical punching in a certain field or fields, and numerical punching in other fields, all as per the code shown in Fig. 17. By "numerical" is meant numbers intended to be added. The "alphabetical" field in the card may also contain numbers, but they are for designating purposes only and are only printed like the letters of the alphabet and are not put into an accumulator.

Each card column passes under a separate brush 710. The index point positions therefore pass under the brushes in the order A, B, C, D, E, and F. If there is a perforation at any position current flows momentarily through the circuit controlled by the brush at the perforation. Each brush reads the perforations serially, one at a time and the function of the translator is to receive the serially-taken readings and convert them into a single reading of the same or related meaning, but suitable for actuating the printing and accumulating devices.

The design of the numerical translator 50 may be understood by reference to Figs. 5, 6, 8, 9, 10, 14 and 15. It comprises a rotatable commutator 102 arranged in two halves with a gear 104 between the halves, the commutator and its gear being mounted for rotation on a stud 106. The design of commutator and brushes may best be understood by reference to Fig. 10 which is a diagrammatic representation of the arrangement. Each rectangle 108 represents a metallic contact, the balance of the commutator surface comprising non conducting material 110.

The brushes corresponding to the four combinational positions are marked A, B, C and D and their normal positions are indicated at the right of Fig. 10. All contacts 108 are inter-connected electrically in each half of the commutator, but the two halves are electrically connected only through wire 112 which joins brushes B and C. The interconnection of contacts 108 is accomplished by forming the hub portion of each commutator section of metal and having the contacts integral therewith. This arrangement is indicated in Fig. 14 which shows specifically the six point alphabetical commutator but will serve to illustrate the four point numerical commutator as well. Each metallic hub is designated 114, the contacts integral therewith 108, and the insulating material 110.

With the brushes in their home positions and the commutator revolving, each brush passes over successively each contact of one of the rows of contacts 108, but no electric circuits are set up thereby. It will be noticed that with the brushes in normal position there is no place on the commutator where current can flow from brush A to brush D because one or more brushes are always on a dead spot on the commutator surface, thereby preventing the establishment of a circuit. To form a circuit it is necessary to shift one or more of the brushes sidewise to traverse a different path on the commutator. This is illustrated by the dotted brushes resting on the line through the digit "3" in Fig. 10. Reference to Fig. 17 shows that in the Peirce code "3" is designated by perforation at positions A and C. In Fig. 10 the dotted brush A has been moved downwardly and dotted brush C has been moved upwardly. Therefore when the "3" position on the commutator reaches the row of brushes an electrical impulse is sent through lead wire 116, brush A, contact 108, commutator body 114, contact 108, brush B, wire 112, brush C, through contacts 108 and commutator body 114 to brush D and back to the line through lead 118.

It will be noticed also that with brushes A and C shifted as above, there is no other position on the commutator which will permit the completion of a circuit through the brushes. When the commutator rotates under the brushes in the direction indicated by the arrow (Fig. 10) the digit positions 9, 8, 7, 6, 5, 4, 3, 2, 1 and 0 pass under the brushes in the order named and the opportunity is offered to complete a circuit at each index position, just as in the Hollerith system the same opportunity is offered as the card passes the sensing brushes. In the Hollerith system a circuit is completed if the card is perforated at any index position; in the present system a circuit is completed if the brushes have been properly shifted at any position.

In the Hollerith system the passage of the card under the sensing brushes is synchronized with the balance of the mechanism to produce the proper differential action in accumulating and printing devices; in the present system the movement of the commutator under its brushes is synchronized to produce exactly the same differential effect as the Hollerith card.

The apparatus for bringing about the shifting of the brushes to produce the above effect will now be described.

Each brush (Figs. 8 and 9) is carried by a brush holder 120, mounted on an insulating block 122 which is fast to a skeleton frame work 124 which is mounted to permit a slight rocking movement on vertical trunnion 126. Frame 124 has an arm 128 extending towards gear 104, and an oppositely extending arm 130.

Each face of gear 104 is provided with two set up cams 132 (Fig. 5) a brush restoring cam 134 and an armature restoring cam 136. Arms 128 corresponding to brushes A and B are in the paths of cams 132 and 134 on one side of gear 104, while arms 128 corresponding to brushes C and D are in the paths of the corresponding cams on the other side of the gear.

As a record card passes the sensing brushes and presents its index points A, B, C and D successively to those brushes, the arms 128 corresponding to commutator brushes A, B, C, and D successively contact with set up cams 132. That is, whenever an analyzing or sensing brush is at a certain index point position on the card, the corresponding arm 128 is on a cam 132 and frame 124 is rotated on its trunnion sufficiently to free the end of arm 130 from its armature 138.

There is an armature 138 associated with each arm 130, the upper end of each armature being normally positioned with reference to arm 130 as shown in Fig. 8 with the pointed end of arm 130 engaging the V-groove 140 in the upper end of the armature.

Figures 6, 6A, 6B:
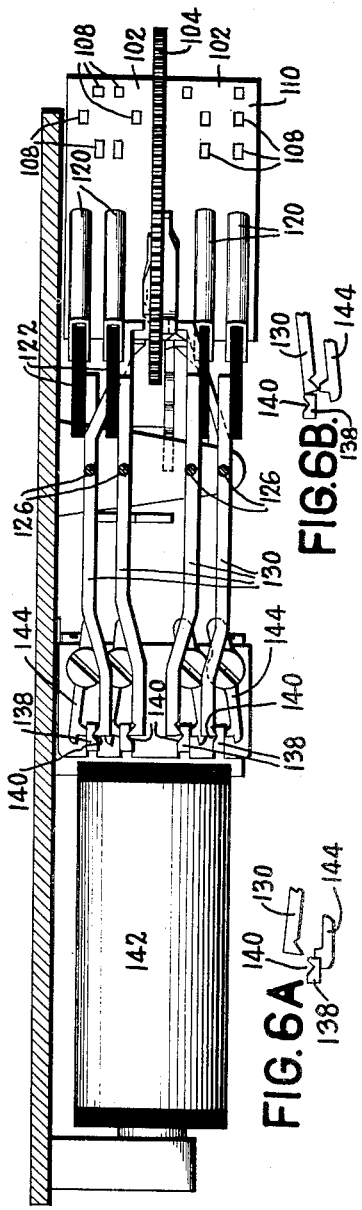
Fig. 6 is a sectional view on line 6—6 of Fig. 5.
Figs. 6a and 6b are detail views showing different positions of the latching device of the numerical translator.

All four armatures 138 are so located as to be attracted to the left whenever magnet 142 (Fig. 5) is energized. However, the armatures are normally prevented, by arms 130 engaging grooves 140, from moving to the left. A spring 144a biases each arm 130 towards its armature 138. Magnet 142 is in the sensing brush circuit, therefore it is energized whenever its brush finds a hole in the record card. As described above, each arm 130 is moved out of engagement with its armature by a cam 132, whenever its corresponding index position is under a sensing brush. If at that position the brush finds a hole in the card, magnet 142 is energized and the corresponding armature 138 (being released by cam 132) is drawn towards the magnet, the other armatures, being engaged by their arms 130 remain in normal position. Figs. 6, 6a and 6b show successive steps of the movements just described. Normally, armatures 138 and arms 130 are interlocked as in Fig. 6. Once every revolution of the commutator each arm 130 is moved by a cam 132 out of engagement with its armature. If while the armature is disengaged an impulse is sent through magnet 142 from a perforation in the card, the armature is drawn to the left and latch 144 urged by spring 146 drops behind it as in Fig. 6a, which represents one of the two lower devices of Fig. 6, and thereby permits arm 130 to return past the armature to assume the position in Fig. 6b, pushing latch 144 ahead of it. When arm 130 is in the position shown in Fig. 6b the brush corresponding to that arm is shifted to a new position over the next adjacent row of contacts 108, and is held there until the passage of restoring cam 134 permits the parts to return to normal. In the meantime the commutator has sent an appropriately timed impulse to the printer and accumulator, as described above with particular reference to the digit "3". Each armature 138 is biased towards the right by a spring 146a. In order to insure proper restoration of the armature a bail 148 on bell crank 150 and operated by cam 136 is provided.

As above described the machine operates to convert a Peirce combinational hole reading on the card into a Hollerith type reading on the commutators, the latter being suitable for actuation of printers and accumulators as will later be described.

The operation of the alphabetical translator shown in Figs. 11, 12, 13, 14, 15 and 16 is exactly the same as the operation of the numerical translator described above, but the arrangement of parts is different, also the number of brushes and controlling parts therefore. Six brushes are provided because the alphabetical portion of the code (Fig. 17) has six positions.

The commutator is in three sections (Fig. 14) and the rows of contacts are laid out as in Fig. 16 with normal position of brushes as at the left of Fig. 16. Reference to the code in Fig. 17 shows that the letter Q is represented by perforations at positions A, C and F. The dotted brushes in Fig. 16 show those three brushes in shifted position to permit flow of current from lead 152 to lead 154.

In the alphabetical translator the commutator is designated 156, the six set up cams are 158, and the restoring cams are 160. The cams are atttached to the hub 162 of gear 164 and during each revolution of the gear make contact with arms 166 attached to frames 168 mounted on horizontal trunnions 170. Springs 172 attached to the frame at convenient points serve to bias arms 166 toward the cams. Brush holders 174 are carried by means of insulating blocks 176 on arms 178 integral with frames 168.

Six armatures 180 are arranged to be attracted by magnet 182 when it is energized. The armatures are pivoted at 184 and are each provided with an upwardly extending arm 186 arranged to cooperate with cam operated arm 178 to latch the brushes in shifted position, exactly as in the numerical translator armature 138 cooperates with arm 130. One difference in detail is the fact that in the alphabetical translator the latching groove 188 (Figs. 14 and 15) is in the cam actuated arm 178, whereas in the numerical device the corresponding groove 140 is in the armature arm 138. Springs 190 normally hold armature 180 out of contact with magnet 182.

In Fig. 14 the five lower devices are in normal position. Fig. 15 shows what happens when armature 186 is moved to the right (by the energization of magnet 182) at the same time that arm 178 is moved downwardly by its cam 158. Latch 192, actuated by spring 194 has latched armature 186 to the right so that when cam 158 has passed, arm 178 will pass behind armature 186 as in the upper device in Fig. 14, with arm 178 above its normal position and its brush shifted to traverse a path along side its normal path until restored to normal by restoring cams 160.

In the above manner the alphabetical translator converts the Peirce combinational hole reading on the card to a Hollerith reading on the translator so that the latter reading may be utilized to control the alphabetical printing device.

The printing devices, both alphabetical and numerical, may be understood from Figs. 1, 2, 3 and 4. For the purpose of illustration only one type bar of each kind is shown, 196 designating the numerical, and 198 the alphabetical bars. As is usual in such devices the type bars are raised by the action of the machine, their upward travel being arrested at the proper point as a result of an electrical impulse actuating a latching device, as will be described.

The lower end of numerical bar 196 is connected by vertical link 200 to the free end of arm 202 which is pivoted at 204 as is best seen in Fig. 3. Arm 202 is urged upwardly by helical spring 206 connected at its upper end to rocker arm 208. The free end of rocker arm 208 is connected by thrust link 210 to rocker arm 212 which is pivoted at 204 on the same shaft as arm 202. The free end of arm 212 is connected by vertical link 214 to an arm 216 of the 3-armed bell crank 218 pivoted on the frame at 220 (Fig. 4). Another arm 222 of the 3-armed bell crank carries a roller 224 rolling on the rim of cam 226 fast to shaft 228. The other arm 230 of bell crank 218 carries roller 232 which rolls on cam 234 also fast on shaft 228. Cams 226 and 234 are complementary, therefore bell crank 218 is positively oscillated in two directions about shaft 220 during each revolution of shaft 228. It follows then that arms 216 and 212 are also positively rocked upwardly and downwardly during each revolution of shaft 228. During the upstroke of arm 212 it pushes arm 208 upwardly by means of push link 210. During the upstroke of arm 208 arm 202 is also drawn upwardly through the instrumentality of helical spring 206 connected at its upper end to arm 208. Inasmuch as numerical type bar 196 is linked to the free end of arm 202 it is also carried upwardly until latch 236 engages one of the ratchet teeth 238 on the edge of the type bar, whereupon arm 212 will continue its upward motion but arm 202 and type bar 196 will remain stationary (Fig. 3), the ratchet tooth being held against dog 236 by spring 206.

The upward movement of type bar 196 is synchronized with the rotation of the commutator of the numerical translator so that the contacts 108 (Fig. 10) representing each digit 9, 8, 7, 6, 5, 4, 3, 2, 1 and 0 are under the translator brushes A, B, C and D at the same instant that the type 240 representing that same digit is at printing position with reference to printing platen 242. If at that instant a circuit passes through the brushes, printing magnet 244, in circuit with the brushes, is energized, armature 246 and callwire 248 are drawn to the right, thereby withdrawing catch 250 from latch 236 and permitting spring 252 to move latch 236 into engagement with a tooth 238. Teeth 238 are spaced to correspond to the spacing of the type 240 therefore, the proper type is held in printing position until the upward stroke of the type bars is completed, whereupon the printing hammer 254 is actuated and the number representing the digit set up on the translator is printed on the record sheet on platen 242.

Detailed description of the hammer actuating devices may be found in my co-pending application, Serial No. 693,572, filed February 18, 1924. Therefore, it is not considered necessary to repeat the description here.

On the return (downward) stroke of arms 216, 208 and 212 the ear 256 on arm 212 engages seat 258 on arm 202 and carries arm 202 and its attached type bar 196 downwardly to home position. Arm 202 is slotted vertically at 260 above pivot 204. Therefore when ear 256 contacts with seat 258, arm 202 is permitted to move momentarily away from pivot 204 thereby permitting spring 206 to absorb the shock of impact instead of pivot 204, thus greatly reducing noise and vibration of the machine.

When the type bars have reached home position pin 262 (Fig. 4) on disc 264 fast on the main shaft of the machine 266, actuates lever 268 to draw downwardly link 270 against spring 272 and rock bail 274 to restore latch 236. Dog 250 retains the latch in home position until it is again released by energization of magnet 244 as described.

The alphabetical type, and numerical type used for designating purposes, are positioned in a manner exactly similar to the positioning of the numerical type as above described. Complementary cams 276 and 278 rock bell crank 280, pivoted at 282, through arms 284 and 286 respectively. Arm 286 is connected by link 288 to rock lever 290 pivoted at 292. The left end 294 of lever 290 is provided with an ear 296, and spring 298, attached at its upper end to arm 299 actuated by push link 301, draws arm 300 upwardly against ear 296 and pivot 292 just as arm 202 of the numerical device is drawn against ear 256 and pivot 260 by spring 206. The free end of arm 300 is connected to the alphabetical type bar 198 by link 302, and the upward travel of bar 198 is synchronized with the rotation of the commutator of the alphabetical translator so that when a circuit is established through brushes A, B, C, D, E and F, a printer magnet is energized and the proper type 304 is positioned at platen 242 to imprint the letter represented by the translator. The alphabetical type bars are latched and then restored exactly as described above in connection with the numerical bars.

Inasmuch as there are more type carried by bars 198 than by numerical bars 196, the alphabetical bars are heavier and I therefore provide spring 306 (Fig. 4) to constantly draw down on arm 290, thereby counter-balancing part of the weight of bar 198. To further assist in starting the alphabetical type bar upwardly from its home position I provide a booster in the form of a lever 308 pivoted to the frame at 310 and forced upwardly against the under side of arm 300 by spring 312. This booster assists the alphabetical bar upwardly until arm 300 passes out of contact with lever 308.

Whenever an electrical impulse is sent to any printer magnet 244 by the numerical translator, an impulse is also sent through a corresponding counter magnet 314 (Figs. 1, 18, 19, 20, 27) in order that the accumulator may be actuated to properly enter the amount therein.

Energization of magnet 314 attracts armature 316, moving it to the right (Fig. 18) thereby unlatching arm 318 of assembly 320, shown in full lines in Fig. 26. This assembly is mounted for oscillation on stud 322 and is normally urged anti-clockwise about pivot 322 by spring 324, therefore when armature 316 releases arm 318, assembly 320 is rotated slightly anti-clockwise. Assembly 320 includes a pair of parallel upwardly extending arms 326 and 328, in the upper ends of which is fixed a horizontal rod 330. On rod 330 is mounted for rotation a sleeve 332 on which are fast the pinions 334 and 336.

Figure 19:
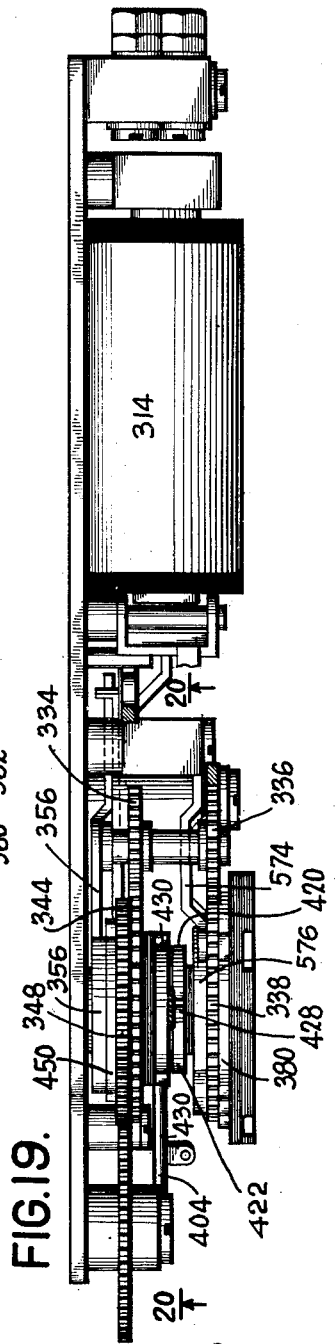
Fig. 19 is a cross section on line 19—19 of Fig. 18.

Pinion 336 is constantly in mesh with gear 338 on a sleeve 340 on stud 342 (Figs. 19, 20 and 23). Pinion 336 and gear 338 are provided with extra long teeth to permit oscillation of assembly 320 without disengaging the teeth of pinion 336 and gear 338. Pinion 334 is aligned to mesh with gear 344 whenever assembly 320 is oscillated to the left (Fig. 26)

and as pinion 334 and gear 344 have teeth of ordinary length they become disengaged when the assembly is in normal position, latched by armature 316.

Gear 344 is fast on sleeve 346 on stud 342. Alongside of gear 344 and rotating with it is gear 348 in mesh with gear 350 which is in constant rotation, therefore gear 344 is also in constant rotation. Pinions 334, 336 and gears 338 and 344 are provided with zero-angle teeth to prevent any tendency to disengage against the pressure of spring 324.

The teeth of pinion 334 and gear 344 are shaped more or less in the form of ratchet teeth, as indicated in Fig. 20, whereby the moving teeth of gear 344 are enabled to readily engage the proper teeth of pinion 344.

With the above construction in mind the differential action of the accumulator may be understood. When magnet 314 is energized, armature 316 releases arm 318 and permits assembly 320 to swing to the left until arm 326 rests against stop 352 (Fig. 20). This movement engages pinion 334 with gear 344 and causes pinion 334 to rotate in synchronism with gear 344, thereby causing pinion 336 and gear 338 to also rotate in synchronism therewith. This rotation continues until a hump 355 on cam 356 passes under finger 358 projecting from the upper end of arm 326, thereby rotating assembly 320 clockwise, disengaging pinion 334 from gear 344 and permitting armature 316 to again latch arm 318. At the same time the free end of detent 360, projecting from the lower portion of assembly 320 enters between teeth of gear 338 and retains that gear against inadvertent movement from the position to which it has been moved. Arm 360 is pivoted to assembly 320 at 362 and is resiliently connected to the assembly by spring 364 as is customary in such devices to prevent breakage in case 360 should encounter the top of a tooth instead of entering between teeth. Pinion 336 is also provided with a detent 366 actuated by spring 368, to engage the teeth of pinion 334 when it is out of mesh with gear 344. When assembly 320 is pushed to the right by cam 356 engaging finger 358 it is given a slight excess movement to provide clearance to permit armature 316 to readily engage arm 318. This excess movement is utilized to positively restore armature 316, which although normally drawn to home position by spring 370 may nevertheless fail to return home. Detent 366 is provided with an arm 372 passing under a lip 374 on the upper end of armature 316 and contacting therewith during the above "excess" stroke to positively restore the armature if it has not been restored by spring 370.

It is apparent that the numerical translator through the above mechanism imparts exactly the same differential action to the accumulator as is imparted by the perforations in the well known Hollerith type of record card. That is, the accumulator begins to rotate at different times in the cycle depending upon when the impulse is received from the translator, and the rotation of the accumulator is stopped at a fixed point in the cycle by cam 356, thereby rotating the accumulator an amount proportional to the value of the digit represented by the numerical translator.

In the operating cycle of the machine, after rotation of the accumulator has been stopped by cam 356, an opportunity is provided for transfer operations to take place if any are required. The transfer operations are effected electrically in much the same manner as in Patent No. 1,372,965 issued March 29, 1921, to C. D. Lake for Electric transfer device. Although the principle of the present transfer device is the same as in the Lake machine, the contact mechanism has been greatly modified and simplified.

After the adding portion of the machine cycle has been completed and cam 355 has functioned to stop rotation of the accumulator wheels, there still remains the transfer, or carry, operation to be performed. That is to say, if any accumulator wheel has been turned to (or through) zero during the adding portion of the cycle, it is necessary to advance one or more adjoining wheels at the left one step in order to show the correct result. If the next adjoining wheel shows a digit less than "9" it is sufficient to advance only that wheel. But if the next adjoining wheel or wheels show "9" it is necessary to advance all the "9" wheels one step, as well as advancing the first wheel to the left of the "9" wheels.

This operation is performed by the devices shown in detail in Figs. 19, 20, 21, 22 and 23. Fast to each gear 338 is a disc 380. The gear and disc are so driven as to make only one quarter revolution for each ten digits. In other words, if the accumulator were to be arranged for visual reading, the digits might be placed on the rim of disc 380, but instead of having only the customary single set of digits on the disc, the set of digits would be repeated four times.

Associated with each disc 380 is a rock lever 382, pivoted on a stud 384, and biased by spring 386 so that finger 388 tends to bear constantly on the rim of disc 380. While disc 380 is indicating the digits 1 to 8 inclusive, finger 388 rests on a concentric portion of the rim, and when the disc indicates "9" the finger drops into a notch 390, as shown in Fig. 21. When disc 380 turns still further to indicate "10" or "0" a point 392 forces lever 382 to the position shown in Fig. 22, in which position it is held by latch 394 engaging catch plate 396 on lever 382. Latch 394 is pivoted at 398 and is drawn towards latching position by spring 400 (Fig. 20).

Mounted on an insulating block 402 at the left end of lever 382 is a brush holder 404 carrying a brush 406. Wire 408 serves to connect the brush to the electric circuit of the machine. Fast to the other end of lever 382 is a brush holder 410 and brush 412 insulated from the lever by bushings 414. Wire 416 serves to connect brush 412 to the machine circuit.

Mounted on sleeve 346 (Fig. 23) for rotation on stud 342 is an insulating bushing 418, carrying a metallic ring 420. This ring is grooved to receive a contact plate 422, the lower end of which is arc shaped as shown in Fig. 20 to insure good electric contact with ring 420. Plate 422 is insulated from the machine by block 424, and is connected to the machine circuit by wire 426.

Projecting from the rim of ring 420 are four equally spaced contact humps. The two diametrically opposed humps 428 at one side of plate 422 are arranged to contact with brush 412, while the two humps 430 on the other side of plate 422 are located to contact with brush 406.

Each plate 422 is electrically connected by its wire 426 to the counter magnet 314 and to the "9" brush 412 of the next higher order of digets.

In the circuit diagram (Fig. 27) three accumulator units are indicated, the upper being "units" and designated "U" the middle one being "tens" and designated T, while the lower one representing "hundreds" is marked H.

For convenience of explanation it will be assumed that during the adding portion of the cycle counter "U" has reached or passed "0" and the transfer devices of that accumulator element are in the position shown in Fig. 22. Counter T is assumed to be standing at "9" and counter H reads less than "9". It is, therefore, necessary to advance both the H and T elements one step in order to show the proper result. This is done as follows. After cam 355 has restored the counter actuating devices as above described, the continued operation of the machine rotates commutator 432 until block 434 completes contact between brushes 436 and 438 (Figs. 1 and 27) and an impulse is transmitted from the right side of line through wire 440, contact 442, wire 444, brush 438, block 434, brush 436, wire 446, wire 408, brush 406, ring 420, plate 422, wire 426, counter magnet 314, of the tens counter "T" to left side of line thereby advancing counter element T, as is necessary. But it is also necessary to advance element "H". Therefore current is sent to its counter magnet through wire 416 "9" brush 412, (see Fig. 21), ring 420, plate 422, wire 426, and through "H" counter magnet to left side of line, thus advancing element "H". The impulse through the transfer circuit is timed to occur when brushes 406 and 412 are in contact with their respective humps on ring 420. Transfer restoring cam 448 on disk 356 is so located as to act on finger 358 to permit the counter elements T and H to advance only one step, as is required to show the proper result. At the same time, transfer trip cam 450 contacts with finger 452 to release latch 394 from plate 396, thereby permitting lever 382 to return to normal position. The transfer operation is then complete and the accumulator is ready to begin another adding cycle.

Inasmuch as element "H" indicates a digit between 1 and 8 inclusive, its finger 388 is on the concentric portion of disc 380 and neither of its brushes 406 or 412 will make contact during the transfer portion of the cycle and no impulses will be transmitted through that element to elements of higher order.

The total taking mechanism is shown in Figs. 1, 7, 18, 19, 24, 25 and 27.

When the operator desires to take a total he rotates knob 460 a quarter turn thereby causing cam 462 to force latch 464 to the right against the tension of spring 466. This releases the right end of lever 468 so that it may rotate clockwise on its pivot pin 470. While lever 468 is thus free, pin 472 on the side of disc 474, engages cam surface 476 on latch arm 480 thereby depressing it sufficiently against spring 482 for catch 484 to clear the bottom of retaining plate 486, thereby permitting arm 480 to move to the right. Arm 480 is pivoted at 488 to the upper end of arm 490 of bell crank 492 which is mounted for rotation on pin 470. Bell crank 492 has a long arm 494 provided at its free end with a roller 496. When no total is being taken, roller 496 contacts only with the reset portion of disc 474, the reset cam being the concentric portion of larger radius designated 498. When catch 484 is released as above described, roller 496 is permitted to drop to the total taking portion of the cam, which is the portion of lesser radius and designated 500, thus permitting bell crank 492 and lever 468 to rotate clockwise on 470.

Underneath pivot 470 is horizontal pin 502 on which is pivoted an arm 504 on which are spring blades 506 and 508 arranged to cooperate with blades 510 and 512 to control contact 514, 516 and 518. Arm 504 is urged upwardly by spring 520 and inasmuch as arm 504 bears against a projection 522 on the left end of lever 468, the single spring 520 serves to move lever 468 and bell crank 492 as above described.

The left end of lever 468 is connected by vertical link 524 to horizontal lever 526 pivoted at 528 in the lower portion of the accumulator. Link 524 is provided at its lower end with a slot 530 which permits movement of arm 468 while link 524 remains stationary. At the right end of lever 526 is pivoted an upwardly extending link 532 provided at its upper end with a hook like end 534 located above but out of contact with a cooperating hook 536 on the lower end of a vertical arm 538 pivoted at 540. Arm 538 is resiliently connected by spring 542 to a horizontal arm 544 so that arms 538 and 544 together form a bell crank biased in clockwise direction about pivot 540 by spring 546.

Bearing on the free end of arm 544 is a vertical rod 548 urged upwardly by spring 550 against the short end 552 of latch lever 554 pivoted on the frame at 556. With latch 554 in the full line position of Fig. 7, arm 538 is held in the position shown, and link 532 is prevented from moving downwardly, but if the latch is in its dotted position pin 548 will be permitted to rise and arm 538 will move to the left in response to its spring 546, thereby permitting arm 532 to move downwardly at a certain time in the machine cycle.

Resting in slot 558 in link 532 is a pin 560 in the free end of horizontal arm 562 pivoted at 564. Also on the free end of arm 562 is a fulcrum block 566 in contact with the under side of spring 324. When the parts of the accumulator are in normal position for adding as in Fig. 18, arm 562 is held in raised position by lever 526 and vertical link 524. Underneath a projection on arm 562 but normally out of contact therewith is a latch 568 on the lower end of arm 570 pivoted at 572. Integral with arm 570 is an upwardly extending arm 574 having its free end in the path of cams 576 fast to gear 338 (Figs. 23, 24 and 25).

While arm 562 is in above normal position the free end of spring 324 is pressed upwardly by fulcrum 566 and serves, as already explained, to swing assembly 320 in counter clockwise direction to carry out the adding operation. But when arm 574 is raised by cam 576, latch 568 is withdrawn from underneath lever 562 which thereupon drops sufficiently to release pressure of fulcrum 566 on spring 324, which then follows the fulcrum downwardly and rotates assembly 320 clockwise instead of anti-clockwise. In other words, spring 324 tends to rotate 320 in one direction when fulcrum 566 is elevated, and in the other direction when the fulcrum is lowered.

Commutator 580 is of insulating material, with four metallic inserts 582 in its rim. The commutator is fast to transfer cam 380 and gear 338, as may be seen in Fig. 23. The commutator therefore has four zero positions. Bearing on the rim of the commutators are two brushes 584 and 586 held by appropriate brush holders and so located that when the commutator is in zero position both brushes 584 and 586 are on a block 582.

A pair of make and break cams 588 and 590 are arranged to operate contacts 592 and 594 to transmit an impulse through the total taking circuit at an instant corresponding to the zero (or 10) position on a card.

Figure 7:
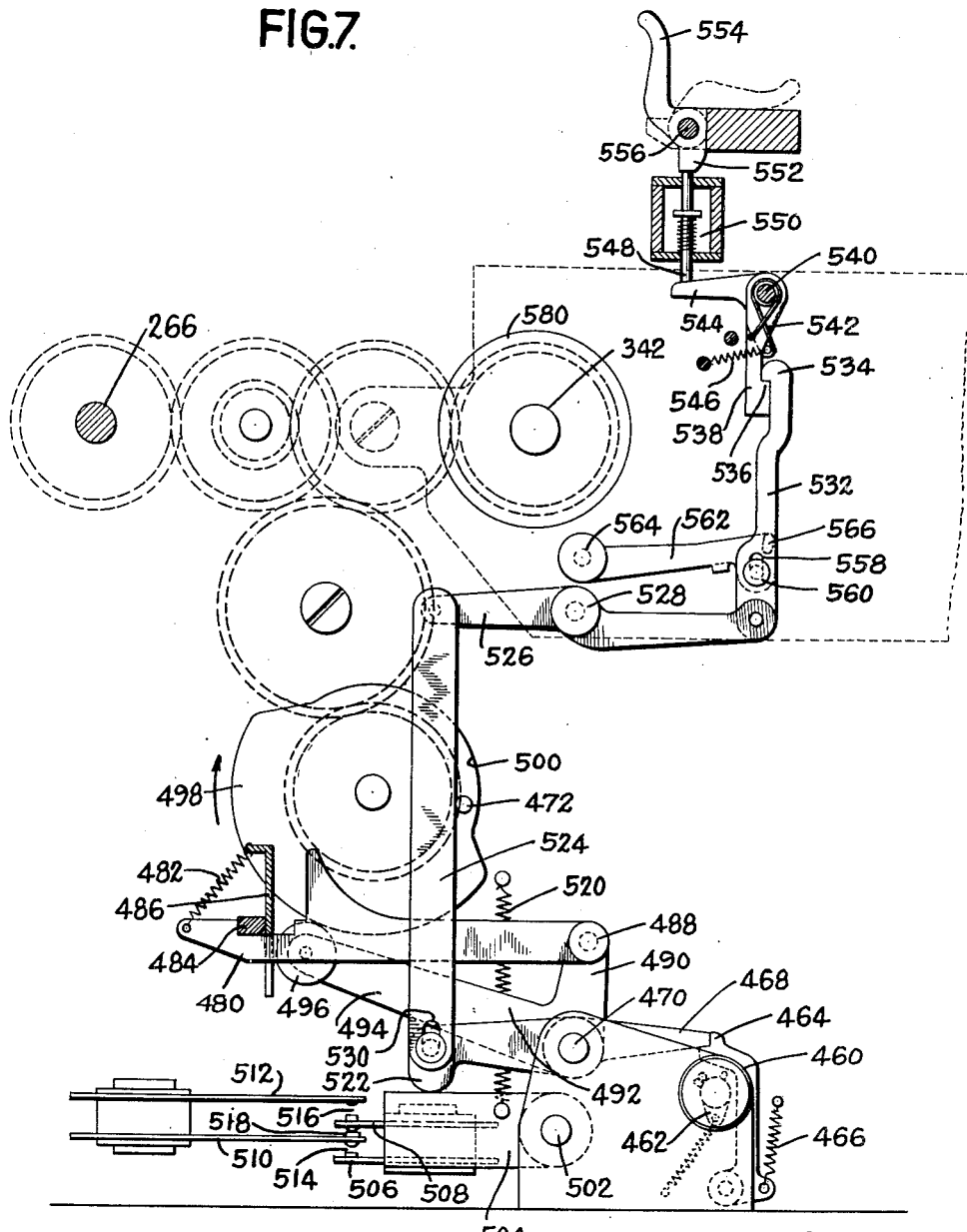
Fig. 7 is an enlarged view of the total taking mechanism.
Figure 11:
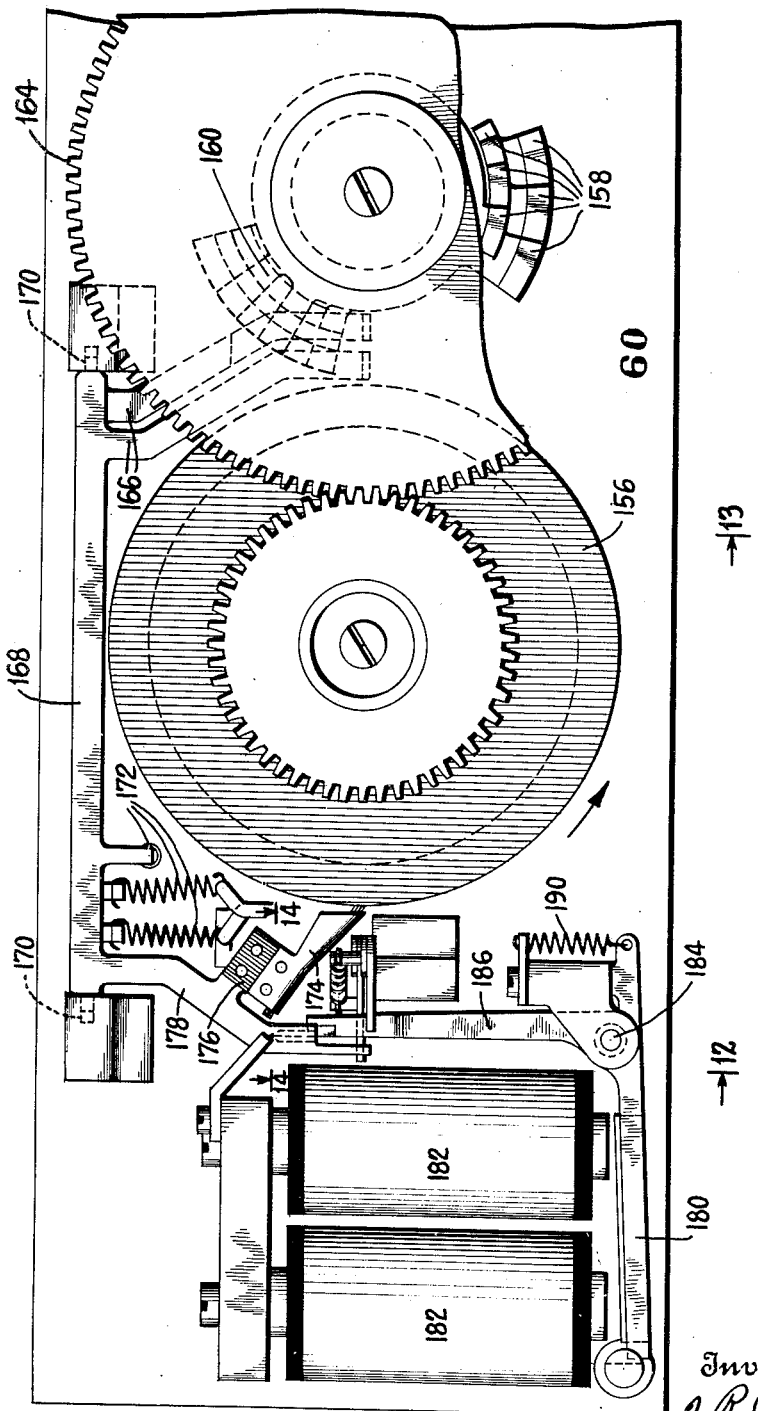
Fig. 11 is a front view, partly broken away, of the alphabetical translator.
Figure 18:
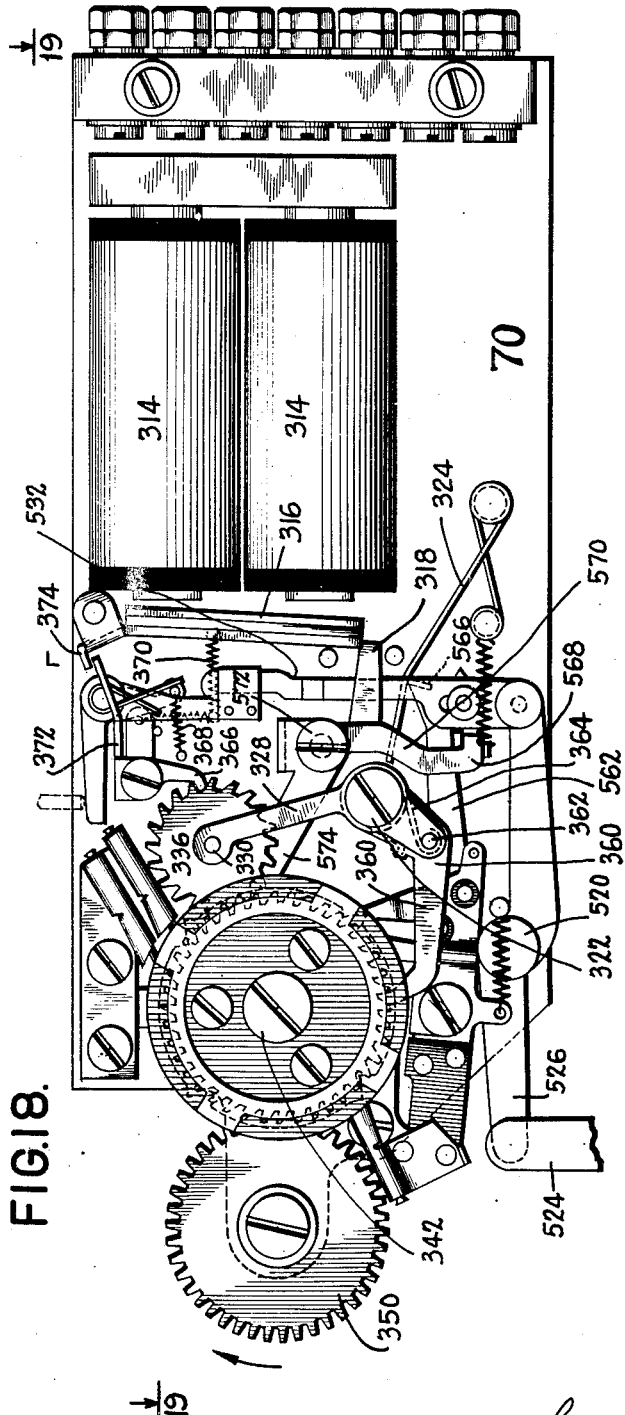
Fig. 18 is a front view of an accumulator.

In the rear of the contacts shown at the bottom of Fig. 7, and controlled in a similar manner, are the contacts designated in the circuit diagram (Fig. 27) as 596, 598, 442, 600 and 602. In the diagram, for convenience of illustration, arms 504 are represented as a pair of vertical members (dotted), one of them designated 604, controlling accumulator contacts 514, 516 and 518 and the other, 606, controlling contacts 596, 598, 442, 600 and 602. Both members 604 and 606 are understood to be shiftable vertically when total taking knob 460 is turned, member 604 moving downwardly and 606 upwardly.

The machine takes either a running total without clearing, or a total with clearing and reset, as desired by the operator.

If he desires a running total he simply turns knob 460, latch 554 being in upright position as in full lines of Fig. 7. The turning of knob causes cam 462 to move arm 468 as already described, to open contacts 518, 596, 598 and 442; and to close contacts 516, 514, 600 and 602. The opening of the above contacts breaks all the card reading, translating, adding, transferring and listing circuits.

With contacts 516, 514, 600 and 602 closed, cams 598 and 590 function to send an impulse through the accumulator at zero card position, current flowing from right of line through wire 608, contact 600, contacts 592, 594, line 610, line 612, all contacts 514, wires 614, all counter magnets 314, to left of line. This actuates all counter magnets to move their register wheels ten steps. Therefore, the reading is the same when the operation is completed as when it began.

During the rotation of the counter wheels the type bars were rising in synchronism with the movements of the register wheels, which in this case may be considered to be the commutators 580, and the motion of each type bar is arrested by an impulse through its printer magnet 244 through a circuit from right side of line through wire 616, contact 602, line 618, lines 620, brushes 586, blocks 582, brushes 584, lines 622, contacts 516, lines 624, and printer magnets 244 to left of line. Since the impulses are received by magnets 244 through block 582 while commutator 580 is at zero position, the printing mechanism is operated to print the numbers indicated by the commutator when the operation was initiated, each block 582 serving to send an impulse exactly as a perforation in a card column closes a circuit to a printer magnet.

The above describes how a total is taken and the reading retained in the accumulator. If it be desired to take a total and clear the counter the procedure is exactly the same as above except that latch 554 is moved to its dotted line position. This, as described, unlatches link 532 and permits it to drop to a lower position during the total taking cycle while roller 496 is on cam 500. This releases arm 562 so that when arm 574 is moved by cam 576 latch 568 is moved out from under arm 562 whereupon spring 324 moves arm 562 downwardly until its pin 676 rests in the bottom of slot 678 of link 532, and at the same time the spring rotates assembly 320 clockwise, moving pinion 334 out of mesh with gear 344 and stopping the counter at zero. At that same instant each set of brushes 584 and 586 sends an impulse to its printer magnet to print the digit which was indicated by that particular counter element at the time the total taking operation was initiated.

After the total taking operation is completed and latch 554 has been placed upright again, continued rotation of disc 474 causes roller 496 to ride on reset cam 498 thus permitting latch block 484 to again engage plate 486 and hold the parts in their normal positions as shown in Fig. 7.

By reference to Figs. 1 and 2 and circuit diagram Fig. 27, the remaining features of the machine may be understood.

Motor 700 drives the machine through sprocket 702 on shaft 266, and receives current through wire 704 when switch 706 is closed. A record card 708 is represented as passing towards the right under the alphabetical sensing brushes 710 and numerical brushes 712. When a brush 710 finds a hole in the alphabetical field of the card a circuit is established from right of line through wire 714, contact 596, wire 716, common bar 718, brush 710, wire 720, plug board 722, wire 724, magnet 182, wire 726, contact 728, brush 730, contact segment 732 on commutator 734, brush 736, and wire 738 to left of line.

Commutator 734 is rotated to close contact between brushes 730 and 736 just after the advancing edge of card 708 reaches the sensing brushes and to break the contact just before the card leaves the brushes.

Contact 728 is under control of cam 740 provided with projections 742 properly synchronized with the index position on the card to break the circuit just before the brush leaves the hole in the card, thereby preventing sparking at the brushes. A condenser 744 is connected around contact 728 to prevent sparking at that contact.

If a brush 712 finds a hole in a numerical field on the card the path of current is the same as just described except that it flows through brushes 712 and numerical magnets 142 instead of through brushes 710 and alphabetical magnets 182.

The brush circuits above described take the Peirce combinational hole readings from the cards and put them into the translators. From the translators the same information is transmitted in Hollerith type readings to the printer and counter magnets in circuits leaving the right side of line through wire 750, contact 598, make and break contacts 752, 754, and wire 756. From wire 756 individual wires 154 lead to the alphabetical translators. From the alphabetical translators wires 152 lead through printer magnets 244 to the left side of the line. A condenser 758 is placed across each pair of wires 152—154 to reduce sparking at the commutator contact blocks 108. The pair of make and break contacts 752—754 is timed to make the circuit only during the portion of the machine cycle during which readings are being taken from the translators.

From wire 756 the circuit to the numerical translators is formed through contact 760 and wire 762 from which the individual wire 118 leads to the translator. Current leaves the numerical translator through wire 116, passing through the counter magnets 314 by way of wire 614, and to printer magnets 244 by contacts 518 and wires 624.

Contact 760 is controlled by points 764 on rotating disc 766 so as to break just before the brush leaves each contact block 108 on the translator, and make just after the next block is reached. A condenser 768 across the line prevents sparking at contact 760. The card feeding devices are shown diagrammatically in Fig. 27 in which a common ring gear 800 drives the two pairs of feeding rollers 803 and 804 through intermediate driving pinions 801 and 802. In Fig. 2 the connection between the constantly rotating ring gear 800 and the driving elements of the machine are disclosed. It will be remembered that the motor 700 drives shaft 266 through the sprocket 702. The ring gear 800 is secured to the constantly rotating shaft 266 so as to drive the pairs of feeding rollers 803 and 804 continuously.

It will be understood that all gearing in the machine, although not described in detail, is properly proportioned and arranged to drive all the machine elements in proper timed relationship to carry out all the operations above described.

I claim:—

1. In an accounting machine adapted for control by record cards containing numerical and alphabetical data in the form of perforations, in combination, a single set of analyzing means for sensing said perforations in a plurality of card columns once while the cards are in motion and means controlled by said sensing means for printing said numerical and alphabetical data on a record sheet.

2. In an accounting machine adapted for control by record cards containing numerical and alphabetical data in the form of perforations in a plurality of card columns, in combination, a single set of analyzing means for reading said records once by forming electric circuits through said perforations, and means controlled by said circuits for printing said numerical and alphabetical data on a record sheet.

3. In an accounting machine adapted for control by record cards containing data in the form of combinational hole perforations, in combination, means for reading said combinational holes, data printing means, and devices controlled by said reading means for translating said combinational hole readings into form for actuating said printing means; each translating device comprising a movable commutator, laterally shiftable brushes cooperating therewith, and a plurality of latches operable by a single magnet.

4. In an accounting machine adapted for control by record cards containing alphabetical data in the form of true combinational hole perforations, in combination, printing devices, and instrumentalities for reading the perforations of a record card once while the record card is in motion and controlling said devices to print on a record sheet the alphabetical data represented by said perforations.

5. In an accounting machine adapted for control by record cards containing alphabetical data in the form of combinational hole perforations, in combination, means for reading said perforations once while the record card is in motion, means for translating the meaning of said readings, and means controlled by said translating means for printing the translated readings on a record sheet.

6. In an accounting machine adapted for control by record cards containing alphabetical data in the form of combinational hole perforations, in combination, means for reading said records once while the record cards are in motion by forming electric circuits through said perforations, translating devices controllable by said circuits, and devices controllable by said translating devices for printing on a record sheet the alphabetical data represented by said perforations.

7. A tabulating machine having an alphabetical printing mechanism, a card feeding means, a single reading means for reading from the cards once and while they are in motion combinational perforations which are representative of alphabetical data, translator means receiving the combinational reading from the reading means and converting said reading into a single timed impulse, and means for controlling the printing mechanism by said single timed impulse.

8. A tabulating apparatus with card feeding means which continuously feeds cards through the machine, means for analyzing combinational hole perforations of the moving cards once only, printing means carrying type representative of at least the complete alphabet, and translator means controlled by the card analyzing means with provision for converting a combinational reading representative of an alphabetical character into a single timed impulse which is adapted to control the printing mechanism to cause a corresponding alphabetical character to be printed.

9. In an accounting machine of the class described, in combination, printing mechanism comprising type bars, resiliently operated means for moving said type bars from normal to printing position, positively operated means for engaging said resiliently operated means to restore said type bars to normal position, said resilient means being arranged to relieve the shock of impact when said positively operated means contacts with said resiliently operated means during said restoring operation.

10. In an accounting machine of the class described, in combination, printing mechanism including a type bar, a pivoted arm operatively connected to said bar, means for moving said bar to printing position, means contacting with said pivoted arm for restoring said bar from printing position, and means operating to remove said arm from its pivot when said contacting means engages said pivoted arm, thereby relieving the shock of impact between said parts.

11. The invention set forth in claim 10, in which resilient means is provided for subsequently automatically restoring said arm to operative relationship with its pivot.

12. In an accounting machine adapted for control by record cards containing numerical and alphabetical data, analyzing means for successively searching index point positions on a controlling record in which certain characters may be represented by single index points and others by combinations of index points in which each index point has reciprocal character designating properties with every other index point of the combination, translating means for converting said combinations of points into time differential equivalents, and means controlled by the translating means for printing said numerical and alphabetical data on a record sheet.

13. In an accounting machine adapted for control by record cards containing numerical and alphabetical data, analyzing means consisting of a single analyzing element for successively searching index point positions on a controlling record in which certain characters may be represented by single index points and others by combinations of index points in which each index point has reciprocal character designating properties with every other index point of the combination, translating means for converting said combinations of points into time differential equivalents, and means controlled by the translating means for printing said numerical and alphabetical data on a record sheet.

14. In an accounting machine adapted for control by record cards containing alphabetical data, in combination, an analyzing means consisting of a single brush for successively searching the combinational index points on the record, a rotary translator for converting the combinational representations into a single timed impulse, and means controlled by the impulse derived for representing the translated character upon a record sheet.

15. In an accounting machine adapted for control by record cards containing alphabetical data, in combination, an analyzing means consisting of a single brush for seaching the combinational index points in a column of the record while the latter is in motion, a rotary translator for converting the combinational representations into a single timed impulse, and means controlled by the derived time impulse for manifesting upon a record sheet the translated character.

16. In a tabulating machine adapted for control by record cards in motion, a single analyzing device for sensing the combinational index points in a column of the record, a rotary translator for translating the combinational reading to a single representation, and a printing mechanism controlled by the translator for manifesting an alphabet character corresponding to the single representation.

17. In a tabulating machine adapted for control by record cards in motion in which letters of the alphabet may be represented by combinational index points, means consisting of a single brush for sensing the combinational perforations, and means controlled by the sensing means for converting the combinational index point readings into indications representing alphabetical characters.

18. In a tabulating machine adapted for control by record cards in motion in which letters of the alphabet are represented by combinational index points, a single set of brushes, one for each card column for sensing the combinational index points, and means controlled by the sensing means for converting the combinational index point readings into indications representing alphabet characters.

19. In a tabulating machine adapted for control by record cards, record analyzing means comprising a single element per card column for sensing combinational index points on the record representing letters of the alphabet, means for translating the combinational index point into a single timed impulse, and printing means controllable by the translating means for manifesting upon a record sheet the character represented by the combinational index points.

20. In a tabulating machine adapted for control by record cards, on which letters of the alphabet are represented by single index points and others by combinational index points in which each index point has reciprocal character designating properties with every other index point of the combination, analyzing means for sensing the index points of the moving card, means for moving the card past the analyzing means, and means controlled by the analyzing means for manifesting alphabet characters according to the representations on the record.

21. In a tabulating machine adapted for control by record cards on which letters of the alphabet are represented by single index points and others by combinational index points in which each index point has reciprocal character designating properties with every other index point of the combination, analyzing means consisting of a single brush for sensing the index points, and means controlled by analyzing means for manifesting alphabet characters according to the representations on the record.

22. In a tabulating machine adapted for control by record cards on which letters of the alphabet are represented by single index points and others by combinational index points in which each index point has reciprocal character designating properties with every other index point of the combination, an analyzing means consisting of a single brush for sensing the index points while the record is in motion, and means controlled by the analyzing means for manifesting alphabet characters according to the representations on the record.

23. In a tabulating machine adapted for control by record cards on which letters of the alphabet are represented by single index points and others by combinational index points in which each index point has reciprocal character designating properties with every other index point of the combination, analyzing means for sensing the index points of the moving card, means for moving the card past the analyzing means, and means for converting the combinational index point readings to a single timed representation.

24. In a tabulating machine adapted for control by record cards on which letters of the alphabet are represented by single index points and others by combinational index points in which each index point has reciprocal character designating properties with every other index point of the combination, analyzing means for sensing the index points of the moving card, means for moving the card past the analyzing means, a translator for converting the combinational index point reading to a single timed impulse, and means controlled by the translator for manifesting an alphabet character upon a record sheet according to the representation on the record card.

In testimony whereof I hereto affix my signature.

JOHN ROYDEN PEIRCE.